Oct. 7, 1941.  H. W. KOST  2,258,555
SHEET METAL NUT
Filed Feb. 5, 1937
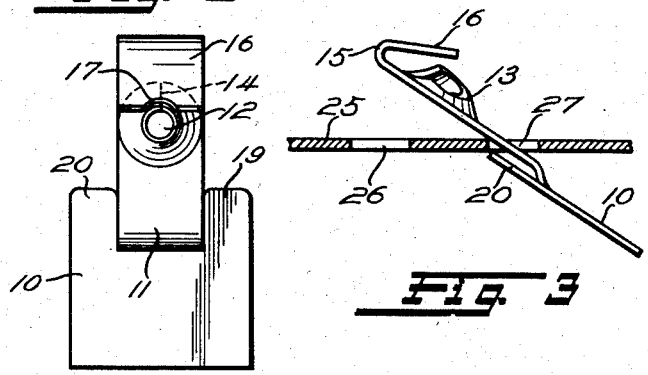
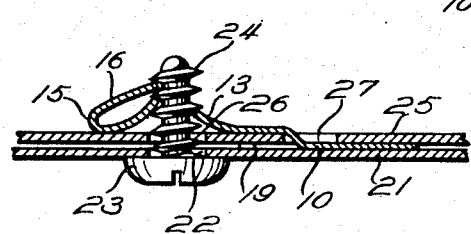
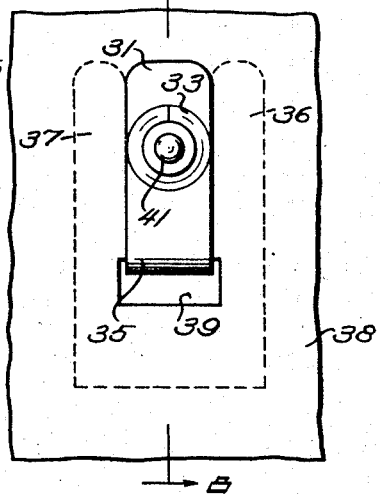
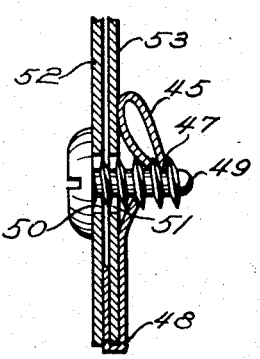
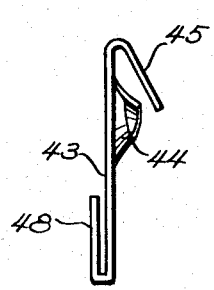
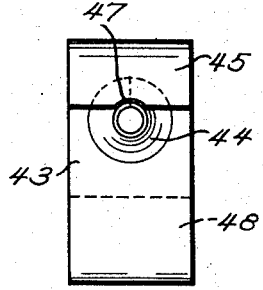
Inventor
Harold W. Kost
By Strauch & Hoffman
Attorneys Patented Oct. 7, 1941

2,258,555

UNITED STATES PATENT OFFICE 2,258,555

SHEET METAL NUT

Harold W. Kost, Detroit, Mich., assignor, by mesne assignments, to Detroit Harvester Company, Detroit, Mich., a corporation of Michigan Application February 5, 1937, Serial No. 124,317

3 Claims. (Cl. 85—36)

This invention relates to a sheet metal nut of the type capable of providing a locked engagement between the nut and the threaded element after the latter has been screwed to its operative position. More particularly, the invention is concerned with an improved self-locking nut having means, formed as an integral part thereof, to fixedly secure the nut to the structure with which it engages.

A principal purpose of the present invention is to provide an improved means, formed as an integral part of the nut, for securing the nut to the structure with which it contacts in such a way that the nut is fixedly held in position, and so that the perforation in the structure, through which the nut attaching means passes, is closed or sealed by the securing means.

Still another object of the invention is to provide a sheet metal self-locking nut with attaching means that will immovably secure the nut to the structure against which it abuts, and at the same time serve as a washer or spacer to separate said structure from the support to which it is attached by a threaded element engaging the nut.

Still another object of the invention is to provide a sheet metal nut with means to permit unscrewing of the threaded element engaged with the nut in the event that the threads of the threaded element, that engage with the nut proper, are stripped.

Still another object of the invention is to provide an improved method of securing a nut to a structure, with which it is associated, involving an application of the nut from the side of the structure opposite from that with which the nut contacts, when it is in holding position, whereby the nut cannot be disengaged from the side of the structure with which it contacts.

Still further objects of the invention will appear as a description thereof proceeds with reference to the accompanying drawing in which:

Figures 1 and 2 are respectively side and plan views of a preferred form of sheet metal nut constructed in accordance with the present invention.

Figure 3 is a fragmental sectional view showing the mode of application of the nut of Figures 1 and 2, to a perforated structure.

Figure 4 is a sectional view showing a complete assembly involving the improved nut of the present invention and a threaded element.

Figures 5 and 6 are respectively plan and side views of a modified form of sheet metal nut.

Figure 7 is a plan view showing the nut of Figures 5 and 6 in assembled relation to a structure to be secured by a threaded element.

Figure 8 is a sectional view taken on the plane indicated by the line 8—8 in Figure 7.

Figures 9 and 10 are respectively side and plan views of a further modified form of sheet metal nut, including the present invention.

Figure 11 is a sectional view corresponding to Figure 8, but showing the nut of Figures 9 and 10 in assembled relation with respect to the structure it supports and a threaded element.

Like reference characters indicate like parts throughout the several figures.

In the preferred form of the invention, illustrated in Figures 1 and 2, the sheet metal nut is constructed from a strip of sheet metal and comprises a body 10 having an elongated part 11 projecting laterally therefrom. The part 11 is provided with an opening 12 formed in a conical protuberance 13 pressed in part 11. The conical protuberance is split as indicated at 14 and, preferably in the process of forming the protuberance, the wall of the opening is pressed so that it assumes a helical form, the edge of the opening constituting a self-locking thread designed to cooperate with a threaded element in a manner hereinafter described.

The end 11 is turned upwardly at 15 providing an integral projection 16 overhanging the opening 12. Said projection is notched, as indicated at 17, so as to engage the threaded element between adjacent threads for the purpose hereinafter referred to.

The body 10 is also provided in the plane of said body with two tongue-like portions 19 and 20 disposed at opposite sides of the part 11, but in the plane of said body. The device just described and illustrated in Figures 1 and 2 may be punched from tempered or untempered sheet metal possessing the characteristics needed for the particular use for which the arrangement is intended. It may be used, for example, to secure fenders to automobile bodies, though it may also be used to secure any two metal or like parts together when a threaded element is used as the securing means.

The preferred mode of using the device of Figures 1 and 2 is illustrated in Figures 3 and 4, in which 21 designates a part of an automobile fender, said fender being provided with an opening 22 for the passage of the shank of a threaded element 23 having screw threads 24. The opening 22 is made of a size so that the threaded element may be freely passed therethrough, that is, the thread 24 does not engage with the wall of said opening. The body structure is designated by 25. This structure is provided with a hole 26 permitting the shank of the threaded element 23 to pass freely therethrough. In spaced relation to the hole 26 a perforation 27 is provided in the support 25.

The nut of Figures 1 and 2 is assembled with respect to the support 25 by tilting the arrangement, as illustrated in Figure 3, and passing it through the perforation 27 in said structure. After the part 11 has been passed through the perforation 27, the device is rocked so as to bring the opening 12 in said part in registry with the hole 26 in said structure. At the same time the tongue-like portions 19 and 20 of the body are brought into engagement with the underside of the structure 25 at one side of the perforation 27, while the body 10 itself engages the under-surface of the structure at the opposite side of said perforation. Inasmuch as the width of the body exceeds the width of the opening, it will be understood that, when the nut is in the position illustrated in Figure 4 of the drawing, the opening 27 will be completely covered by portions of the body 10, the tongue-like projections 19 and 20 and by the part 11, whereby the perforation is substantially sealed thus preventing the entry of moisture through said perforation into the automobile body. It will be observed further that, after the nut is in assembled relation, it is fixedly held in engagement with the structure 25, the parts being so proportioned that it is necessary to spring the nut into interlocked engagement with the structure 25. Accordingly the nut will not become accidentally disengaged after it has been assembled with respect to the structure and prior to the application of the threaded element.

After the nut has been assembled with respect to the structure 25, the arrangement is ready for the reception of the fender 21 and the threaded element 23. The fender is brought opposite the structure 25 until the opening 22 therein registers with the opening 26. The shank of the threaded element 23 is then passed through the aligned openings into threaded engagement with the opening 12 and the part 11, and it is turned through said opening to fasten the fender and support together by means of a threaded element. As the rotation of the screw continues the thread 24 will bear upon the top of the conical protuberance and as the rotation continues to draw the screw or bolt tight, said protuberance is flattened, causing the wall of the opening 12 to very firmly frictionally engage the shank of the threaded element at the base of the thread in a manner more fully described in the application of Bion C. Place, Serial No. 87,292, filed June 25, 1936, issued as Patent No. 2,081,065, May 18, 1937.

In the course of the application of the threaded element the notch 17 in the overhanging projection 16 engages the shank of the screw beyond the threads engaged by the wall of the opening 12. The purpose of this engagement is to provide a connection between the nut and the screw that will permit the threaded element to be unthreaded from the nut in the unexpected event that the screw threads, that engage with the wall of the opening 11, are stripped. Without such overhanging projection some difficulty might be encountered in disengaging the screw from the nut in the event of stripping of certain threads of the threaded element.

A somewhat simplified form of the present invention is illustrated in Figures 5 and 6 of the drawing in which a nut having a body 30 and a part 31 extending laterally therefrom is illustrated. The part 31 is provided with an opening 32 in a conical protuberance 33 that is split at 34. Part 31 is offset with respect to the body as indicated at 35. Also extending laterally at opposite sides of the part 31 are tongue-like projections 36 and 37 disposed in the plane of said body.

The modified arrangement just described is used in the manner illustrated in Figures 7 and 8 of the drawing in which it is applied to a structure 38 through a perforation 39 therein in a manner obvious from that already described with respect to the preferred form of the invention. It will be observed that in applied position the tongue-like portions 36 and 37 extend beyond at each side of the hole 30 in the support. Accordingly, when the threaded element 41 is passed through a hole in the support of structure 42 into engagement with the opening 32 in the conical protuberance 33 in the manner before described, said tongue-like projections serve to support and space the supported structure 42 from the structure 38 at the point at which the threaded element passes through said structure. Thus said tongue-like projections 36 and 37 serve the purpose of a washer.

In the form of the invention illustrated in Figures 9 and 10, the nut 43 is provided with a conical protuberance 44 and an opening therein of the kind already described. Said nut also has an overhanging projection 45 having a notch 47 therein corresponding in structure and function to the overhanging portion 16 and notch 17 in the preferred form of the invention. In order to secure this nut to a structure with which it contacts, it is provided with a hook 48.

One way of using the invention of Figures 9 and 10 is illustrated in Figure 11, in which the nut is shown engaged with a threaded element 49 passing through aligned openings 50 and 51 in structures 52 and 53. The engagement between the threaded element 49 and the nut is similar to that of the preferred form of invention. However, in this modification it will be observed that the nut is first hooked on the edge of the structure 53, that is, the engagement is brought about in a manner different from that of the preferred form of the invention. The hook 48 prevents rotation of the nut during the application of the threaded element. Of course, it will be understood that the hook may be engaged with the structure 53 through an opening therein instead of upon the margin thereof as illustrated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Petters Patent is:

1. A sheet metal nut and nut securing means, comprising a strip of metal consisting of a body and a part having a self-locking thread projecting laterally of said body, and two tongue-like portions disposed at the sides of said part and also projecting laterally of said body, said body and tongues being disposed in the same plane, and said part being offset from said plane into a parallel plane to space said part above said body and tongues sufficiently to receive a portion of the structure to which the nut is to be secured.

2. A sheet metal nut having a single thread of the thickness of the sheet metal shaped from the metal and having an integral projection overhanging the nut and provided with a notch providing a part of a thread to engage the threaded element for the nut beyond the nut whereby the element may be disengaged from said nut if the nut-engaging thread thereof is stripped and means integral with said nut to secure it to the structure engaged by the nut consisting in a U-shaped portion to the cross portion of which said nut is secured.

3. A fastener comprising a strip of metal consisting of a body and a part having a screw thread receiving portion projecting laterally of said body, and two transversely spaced tongue-like portions projecting laterally of said body, said body and tongues being disposed in the same plane, and said part being offset from said plane into a parallel plane to space said part above said body and tongues sufficiently to receive a portion of the structure to which the screw thread receiving portion is secured.

HAROLD W. KOST.